Patented July 9, 1935

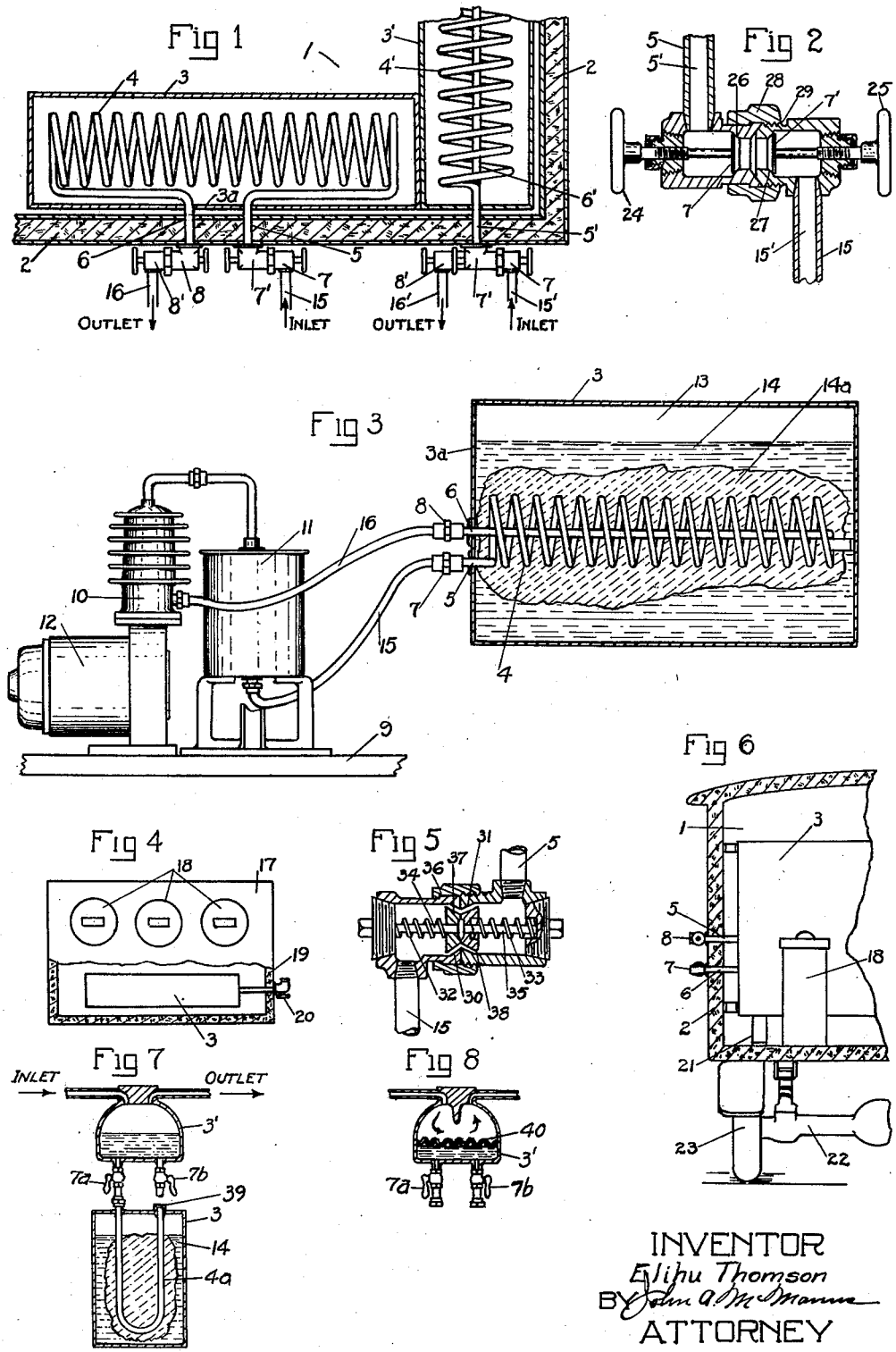

2,007,288

UNITED STATES PATENT OFFICE 2,007,288

REFRIGERATION

Elihu Thomson, Swampscott, Mass., assignor to John A. McManus, Marblehead, Mass.

Application December 3, 1932, Serial No. 645,591

9 Claims. (Cl. 62—95)

The object of the present invention is to effect improvements in the preparation and use of cooling containers of the character described and illustrated in my Reissue Patent No. 17,826 of October 14, 1930, wherein a sealed container has within it a freezable liquid of high latent heat of fusion, the said container being ordinarily placed in an ammonia or other suitable refrigerated chamber for a suitable length of time until the liquid in the container has become frozen, whereafter the sealed container is taken out of the refrigerated chamber and put into commercial use, such as in a thermally insulated receptacle in cooling relation to a can containing ice cream, or other perishable product to be preserved at a predetermined low temperature during transportation or during use for the vending of ice cream or other product to be preserved. After these containers have largely expended their storage of cold, they are again put into the refrigerated chamber for refreezing of the freezing liquid. Once these containers have been sealed, there is no occasion for reopening them, but they are used over and over again by the above-mentioned process.

By means of my present invention, I provide a novel means for freezing such containers by a different and novel method, whereby it is unnecessary to freeze the liquid in the containers in a refrigerated chamber of the character above described, but they may be frozen by attachment to a mechanical refrigerator system, including a compressor, condenser, etc., and where the containers are to be retained in a fixed location such a method is especially desirable, as the containers, or more strictly speaking, the liquid in the containers, may be frozen in situ; for example, in a thermally insulated chamber, such as in a delivery truck for ice cream and the like, or in place, in a refrigerating railway car. In such cases, the cooling container is provided with a suitable evaporator, such as an evaporating coil for freezing a liquid, said container being provided with a liquid having a large latent heat of fusion. In my Patent No. 1,568,102 of January 5, 1926, Refrigerating apparatus, a system is shown, disclosing the principle of "hold-over" or "storage of cold" to give periods of rest for the refrigerating compressor, but no provision is made, as is one of the objects of the present invention, viz. readily to freeze separate sealed containers having evaporators therein to be used somewhat remote from the refrigerating apparatus itself and to connect said containers to the refrigerating apparatus by a valve means readily accessible just outside or exteriorly of the container walls and of such construction that there will be substantially no leaks of liquid refrigerant or entrainment of outside air.

To this end the containers of my invention are provided with a suitable and effective arrangement for readily connecting them to a refrigerating source for freezing of the liquid or eutectic therein; and likewise, for disconnecting the containers with expedition, and with substantially no loss of refrigerant liquid from the refrigerating source, or entrance of outside air into the refrigerating system, assuming the source to be a mechanical refrigerating machine comprising a compressor and condenser, the evaporator as above described being associated with the sealed container and preferably immersed in the freezing liquid or eutectic in said sealed containers.

Another object of my invention is to freeze the storage unit by cooling the refrigerant liquid in an evaporating chamber separate from the circulating coil or chamber in the storage unit by means of a suitable refrigerant gas, such as $SO_2$, for example, and then conveying the refrigerant liquid into or through this circulating coil associated with the storage unit. The storage unit is nearly filled with a freezable liquid which may surround the circulating coil therein, thereby permitting the circulating coil to freeze the liquid surrounding it into a frozen block. The refrigerant liquid which is cooled and conveyed into the circulating coil of the storage unit in this manner may be any suitable refrigerant liquid, such as alcohol, kerosene, brine or even mercury cooled by a vaporizable refrigerant. In the event that mercury is used as the cooling liquid to be conveyed into the cooling chamber to form ice, on account of its high specific gravity and in order not to increase the weight of the storage container by sealing the mercury therein, the mercury may be conveyed or drained out of the circulating coil in the storage unit after the freezing of the contents of the latter and the valves on the ends of the cooling chamber or coil closed. Of course, this mercury may be used over and over again for the cooling subsequently of other storage units.

Still another object of my invention is to so locate these containers for the "hold-over" or storage of cold that there will preferably be a convection space between them and the product to be preserved, and that said product will be cooled entirely by convection of cold air from the container or refrigerating unit.

The detailed apparatus and manner of carrying out my invention will be more clearly understood by specific reference to the accompanying specification and drawing, wherein Fig. 1 represents a partial sectional plan view of a thermally insulated chamber and the apparatus of my invention for cooling said chamber, and showing the valves for connecting the apparatus to the refrigerating system, the freezable liquid being not indicated for clarity of illustration;

Fig. 2 shows in elevation and partial section a special form of valve adapted for employment with the apparatus of my invention;

Fig. 3 illustrates in elevation and partial section apparatus including a compressor and condenser in operative relation with the special refrigerating unit of my invention and charging the evaporator of said unit with a vaporizable liquid which, during evaporation, produces ice around the evaporator by means of a freezable liquid in the refrigerating unit;

Fig. 4 represents a plan view and partial section of a food cabinet, such as an ice cream cabinet, equipped with one of the refrigerating units of my invention and the valve means for connecting said unit to a refrigerating system;

Fig. 5 illustrates in sectional elevation an automatic valve adapted to be used with the refrigerating units of the invention, and such a valve may be employed in the apparatus of Fig. 3;

Fig. 6 represents in end elevation and partial section a vehicle, such as a refrigerating car, equipped with the apparatus of my invention;

Fig. 7 represents in sectional elevation a modification of the invention wherein the refrigerant liquid itself is conveyed into a circulating chamber or coil of the storage unit from an evaporator separate from the chamber or coil in the storage unit.

Fig. 8 represents a modification of Fig. 7 in which a partition separates the refrigerant liquid to be cooled and circulated, from the condensed refrigerant, or refrigerant gaseous vapor as the case may be.

Referring now to Fig. 1, the refrigerating chamber 1 to be cooled is surrounded by walls 2 provided with a good thickness of thermal insulator, such as cork, or any other desirable insulating material. Containers 3 and 3' are suitably installed in said refrigerating chamber in convective cooling relation with products to be preserved in said chamber. These containers may be of any practical or desirable size constructed essentially on the principle of the container in my Reissue Patent No. 17,826 of October 14, 1930, but having the additional feature that they are also provided with a vaporizer which, in the present instance, I have represented as being in the form of coils 4 and 4' and having inlet and outlet connections 5 and 6 respectively extending through the outer wall 3a of the container 3, this wall 3a being the one adjacent to the chamber wall through which the inlet and outlet connections 5 and 6 also extend. Just outside this chamber wall are valves 7 and 8 which are attached to the connections 5 and 6 respectively, in order to provide inlet and outlet valves for the evaporator coil 4. Likewise, the evaporator coil 4' is provided with valve connections 5', 6' and valves 7' and 8'. The container 3 has within it a body of freezable liquid of desired character, such as alcohol and water, glycerine and water, or a solution of salt and water, such as chlorid of sodium or sodium hyposulfite may be used; or sulfate of sodium, the percentages of the salts which are added to the water being proportioned in accordance with the freezing points of the material which it may be desired that such material should have. Of course, any suitable eutectic solution may be properly proportioned for the work to be done, and in cases where it is desirable to go to very low temperatures below the freezing point of water, it is only necessary to select the mixture or eutectic which is best adapted for the particular purpose, such as the production of a flint-hard ice around the evaporator, in order that the container may have a longer storage capacity for cold. It is essential in these containers to provide a space above the freezing solution or eutectic, which space is best made nearly vacuous and the volume of which space is great enough to allow a free expansion during the freezing of the liquid. The preparation of this liquid and the general method of making these sealed containers is fully disclosed in my reissue patent above referred to. Of course, it is a possibility that a freezable liquid could be selected which has substantially no expansion on freezing. In such an event, the provision of a partially vacuous expansion space would not be so important.

Referring now to Fig. 3, a suitable refrigerating apparatus is mounted on a base 9, this apparatus in the present instance comprising a pump which is enclosed in the cylinder 10 and a condenser which is enclosed in the cylinder 11, a suitable motor 12 being provided to drive the pump. Container 3 is shown closed and preferably sealed and in which container is a freezable liquid 14; and represented in a partially solidified state by 14a. Immersed in the liquid is an evaporator coil 4 having an inlet connection 5 and an outlet connection 6 extending through an end wall 3a of the container 3. These connections 5 and 6 are each provided with valves 7 and 8 respectively, and these valves, in turn, being connected to pipes 15 and 16, which may be flexible or otherwise and attached respectively to the condenser 11 and the pump 10. I prefer in the illustration in Fig. 3 to regard the valves 7 and 8 as being automatic in character similar to the valve illustrated in Fig. 5, and the detailed construction and operation of this valve will be described later on in this specification.

Referring now to Fig. 4, 17 represents a refrigerating cabinet, such as a food cabinet, for the storage of ice cream and the like. In the present instance, the cabinet is shown as being provided with three ice cream containers 18, such as the conventional five gallon ice cream cans. The cabinet, of course, is provided with suitable thermal insulation and in the section broken away in the figure and illustrated in the plan is one of my improved refrigerating units or containers 3 having suitable connections extending through the wall 19 of the cabinet and provided with the outlet connections and valve construction of my invention, one of the valves being shown at 20. However, in case it is not desired to charge the container 3 in situ, but merely to utilize it as a portable unit, it is obvious that it will not be necessary to have the valve connections extend through the cabinet.

Referring now to Fig. 6, the chamber 1 to be cooled is as in Fig. 1 provided with walls of good thermal insulating material 2, and a large refrigerating unit or container 3 of my invention is shown, properly supported in a refrigerating car or other movable vehicle having a storage chamber for ice cream or other perishable products to be maintained at a predetermined low temperature. This refrigerating unit 3 is shown as being supported on legs, one of which is illustrated at 21, the refrigerating unit 3 having the inlet and outlet connections 5 and 6 and provided with valves 7 and 8. Stored in the chamber 1 is illustrated in this case an ice cream container 13 to be preserved at the required temperature, such as a temperature in the neighborhood of 10° F., the exact temperature, of course, depending upon the particular mixture of ice cream and other modifying conditions. The axle of the vehicle is indicated by the numeral 22 and one of the wheels thereof by the numeral 23.

Referring to Fig. 7, the container 3 is provided with a circulating coil 4a and valves 7a and 7b, controlling communication to a separate chamber or evaporator 3', which contains a refrigerant liquid, such as $SO_2$, or ether or alcohol of low boiling point; or mercury, and this chamber is connected with suitable means for causing evaporation above the refrigerant liquid in the chamber 3', in order to cool said liquid before the same is delivered to the circulating coil 4a in the container 3. The pipes marked "inlet" and "outlet" in the figure connect with the compressor and condenser of the refrigerating apparatus. However, the object is to cool the unvaporized refrigerant in the coil 4a, to the required low temperature regardless of how it is accomplished. If mercury be selected as a refrigerant liquid, the mercury need not be retained in the circulating coil 4a, but may after this circulating coil has sufficiently frozen the surrounding freezable liquid 14, be drained out of the coil 4a, or drained out in any desirable way, the coil 4a then being closed by suitable valves and the storage unit removed or disconnected from the chamber 3' and used as an isolated source of cold as in the manner hereinbefore pointed out. Where alcohol, kerosene, mercury or the like is used as the circulating liquid refrigerant in the coil 4a, it may not be necessary to use a special type of valve, as illustrated in Figs. 2 and 5, but any suitable stop cock valve 7a, 7b may be used, as there is not the same precautions necessary to be taken against leakage as in the employment of sulphur dioxide, methyl chloride or analogous liquid refrigerant. However, there are possible advantages in using the automatic valve of Fig. 5 even in this case. After the valves 7a and 7b have been closed to cut off communication between chambers 3 and 3', the ends of the circulating coil 4a exteriorly of the container 3 may be sealed or capped in any suitable manner, the right-hand leg of coil 4a being shown broken away and sealed by a cap 39 in order to illustrate how the storage units cooled in accordance with the method above described are charged, sealed and removed.

In Fig. 8, a modification of the construction of Fig. 7 is shown wherein a partition 40 preferably of corrugated metal, is provided in the chamber or evaporator of the container 3', in order to separate the liquid refrigerant from the vaporizable refrigerant on the other side of the partition for cooling the liquid. In such a case, if mercury is used as the cooling agent, any suitable vaporizable refrigerant on the upper side of the partition may be used for cooling the mercury.

Referring now to Fig. 2, this figure illustrates a type of valve which may be employed to carry out the provisions of that part of my invention wherein evaporation of a refrigerant liquid is performed in the coil or chamber of the storage unit itself, and which valve is designed to have as small an aperture as possible on either side of the joint and thus involve little loss of refrigerant liquid, and the construction permits manipulation of the opening and closing of the passages to and from the evaporator coil so that there will be substantially no entrance of surrounding or ambient air into the refrigerating system. In this figure, for convenience, we may call the inlet passage 5' and the outlet passage 15', and communication with these passages is controlled by the valve handles 24 and 25, which control valves 7 and 7' with respect to their valve seats 26 and 27. Cooperating with these two valves is a union 28 which is threaded to engage with a complementary threaded portion in the casing 29 of the valve. The operation of this valve is as follows. In order to charge the evaporator coil 4', for example, in Fig. 1, both valve handles 24 and 25 are screwed outwardly, in order to bring the valves 7 and 7' away from their seats 26 and 27. This permits the refrigerant liquid from the condenser 11 of the refrigerating machine to be delivered through the inlet passage 5' to the outlet passage 15' and into the vaporizer coil 4', where, by means of a pump in casing 10 of the refrigerating apparatus, the refrigerant liquid is vaporized. After this vaporization of the refrigerant liquid and the cooling of the body of freezable liquid surrounding the evaporator coil 4' to the extent to form a frozen block around said evaporator, the valve handles 24 and 25 are both closed by screwing them inwardly and the union or coupling 28 is unscrewed, so that the pipes 5 and 15 and 6 and 16 (Fig. 1) may be disconnected, and the refrigerating unit comprising the unit 3 and the evaporator coils 4 or 4' may be detached from the refrigerating apparatus and moved away therefrom, or it may be transported for delivery-wagon service or other isolated use, as in the ice cream cabinet 17, Fig. 4. After such use and after they have expended their energy or storage of cold, either in whole or in part, the units may be again connected up to the refrigerating system, and the previous operation again repeated, namely, the valves 7 and 7' or 8 and 8' are joined together by means of the coupling 28 and the valves opened for recharging.

In regard to the automatic valve shown in Fig. 5 as being exemplified in its application to the case, Fig. 3, a type of valve is shown, in which there are two valves 37 and 38, operated by springs 32 and 33 respectively guided by corresponding spindles 34 and 35 to keep the valves in line and having their respective valve seats 30 and 31. The coupling 36 is also provided to screw the valves 37 and 38 together, thus connecting pipes 5 and 15. When the coupling 36 is screwed so as to bring the two valves 37 and 38 together, the valves 37 and 38 are automatically forced away from their seats 30 and 31, thus permitting the passage of refrigerant liquid through the valves and through the inlet and outlet connections 5 and 15 of the vaporizing coil. After the refrigerating unit in the container 3 has been charged thus, the coupling 36 is unscrewed, and the connections broken, the unscrewing of the coupling automatically bringing the two valves 37 and 38 again to their seats 30 and 31, closing them, so that there will be no appreciable loss of refrigerant liquid or entrance of outside air into the refrigerating system or into the evaporator. It is deemed desirable that the construction Fig. 5 be made quite accurately to prevent leakage. The coupling 36 may be constructed so as to be permanently retained on one of the pipe connections, as by pipe connection 15, for example.

It will thus be seen that I have provided by my invention a novel and utilitarian means for storing cold in a refrigerating unit which constitutes a decided departure in the art of refrigeration. Such a unit may be charged in situ; that is, in place in a refrigerating truck or a refrigerating railway car, in a refrigerating cabinet of small proportion, such as an ice cream cabinet, or in a large refrigerating chest, one of the desirable provisions being that this storage unit shall be equipped with valves and valve connections enabling the unit to be readily connected to a refrigerating system and disconnected therefrom without any appreciable loss of the volatile refrigerant liquid or the entrance of extraneous air into the refrigerating system; that is, into the condenser and pump of the refrigerating machine or into the evaporating coil being charged. By a modified aspect of my invention, the unit may be cooled by the circulation through the unit of a freezing agent, the latter being cooled by evaporation before reaching the storage unit itself, as hereinabove described. By such a method also, the refrigerating units become portable, permitting a wide variety of applications for isolated storage of cold, the degree of temperature at which the refrigerating units are to be subjected being dependent upon the particular commercial application. In some cases, it is desirable that the frozen block formed around the evaporating coil be carried on to an extent that it becomes flint hard, thus extending the period of storage or time of giving up its latent heat of melting. In other cases, it may not be desirable to carry the lowering of the temperature to such lengths.

It may also be desirable, in some instances, to so connect these refrigerating units to a refrigerating system that a number of such units may be charged at the same time. This, of course, would constitute merely an obvious modification of the invention.

What I claim and desire to secure by Letters Patent of the United States is:

1. The combination of a refrigerator and a refrigerating unit, the latter comprising a sealed container having an expansion space therein, an evaporator in said container, a freezable liquid having a high latent heat of liquefaction surrounding the evaporator, inlet and outlet connections extending from the evaporator through the walls of the container, valves in said connections for opening and closing the latter, conduits for conveying refrigerating liquid from the refrigerator to the evaporator in the sealed container, valves in the ends of the conduits, a coupling whereby the refrigerator conduits and evaporator connections operatively engage each other, and means operated by the coupling to open the valves in one position and close the valves in another position.

2. As an article of manufacture, a refrigerating unit comprising a sealed container having an expansion space therein, a freezable liquid in the container, an evaporator immersed in the freezable liquid, inlet and outlet connections for the evaporator sealably extending through the container walls and valves in the inlet and outlet connections automatically openable and closable upon connection and disconnection to a suitable refrigerating system whereby the refrigerating unit may be frozen and subsequently detached from said system and used as an isolated storage for cold.

3. In combination a storage chamber for cold consisting of a non-rupturable closed tank having a cooling chamber therein substantially immersed in a freezable liquid, inlet and outlet connections for the cooling chamber outside the tank, double valves in both the inlet and outlet connections respectively, and cooperating valve seats in each connection so closely related one with respect to the other of each double valve that a suitable refrigerant may be supplied to or cut off from the cooling chamber upon opening or closing of the valves on their seats with substantially no loss of refrigerant or intake of ambient air, and a coupling which when screwed up to bring the connections together automatically opens the valves and when unscrewed automatically closes said valves.

4. In combination a storage unit for cold consisting of a closed tank non-rupturable by the freezing of a liquid therein, a circulating chamber in the storage unit substantially immersed in a freezable liquid, a second chamber communicating with the first and containing a circulating freezing agent, evaporating means cooperatively related to the second chamber and separated from the freezing agent by a diaphragm for cooling the circulating freezing agent, means for delivering the freezing agent cooled as above to the circulating chamber in the storage unit to form a frozen block around the circulating chamber in the storage unit and means for sealing the storage unit after freezing, and disconnecting it from the second chamber whereby the storage unit may be used for isolated storage of cold.

5. A closed portable storage container for cold having a freezing mixture therein, a cooling chamber substantially immersed in said freezing mixture whereby the latter is converted to ice around said chamber, pipes communicating with the chamber extending through the walls of the container, and valves in said pipes outside the container adjustable to open or close communication with the cooling chamber automatically by connection or disconnection with an external refrigerating apparatus.

6. A refrigerating apparatus comprising a sealed container having a freezable liquid therein, a cooling coil in the freezable liquid, a source of refrigerant liquid independent of the sealed container, means for taking the refrigerant liquid from the source to the sealed container, connecting pipes between the source and the cooling coil, spring-pressed plunger valves in the connecting pipes, and coupling members cooperating with the valves and the springs to permit automatic opening and closing of said valves by moving the coupling members.

7. A refrigerating apparatus comprising a valveless container having a freezable liquid therein, a cooling chamber in the freezable liquid, a receptacle for unvaporized refrigerant liquid independent of the container connected by pipes with the cooling chamber in the sealed container, a diaphragm in said receptacle dividing the latter into two compartments, valves in the pipes between the source of unvaporized refrigerant liquid and the container and means in the receptacle for cooling the unvaporized refrigerant liquid on one side of the diaphragm by vaporizing a refrigerant liquid on the other side of said diaphragm.

8. In combination a closed cold storage unit comprising a sealed valveless container having a cooling chamber therein surrounded by a eutectic solution congealable at a predetermined low temperature to form a body of ice, a circulating refrigerant in said cooling chamber, communicating pipes constituting inlet and outlet connections to said cooling chamber said pipes extending sealably through the walls of the container, coupling elements in each of said pipes exterior of the container, and valves in the coupling elements whereby the cooling chamber may be recharged with circulating refrigerant after the storage unit has wholly or partly expended its cooling capacity.

9. An article of manufacture consisting of a closed cold storage unit comprising a container having an evaporator therein surrounded by a body of ice, a refrigerant in said evaporator which produces cold by evaporation and expansion, communicating pipes to and from the evaporator extending through the container walls, and valves in the inlet and outlet ends respectively of said pipes exteriorly of the container, each pipe having a coupling therein in association with its respective valve whereby filling pipes from a source of refrigerant may be engaged with the evaporator pipes by means of said couplings, and the valves in the evaporator pipes opened and closed by the connection and disconnection respectively of the couplings with the filling pipes connected with the source of refrigerant.

ELIHU THOMSON.